US012079280B2

(12) United States Patent
Wang et al.

(10) Patent No.: US 12,079,280 B2
(45) Date of Patent: Sep. 3, 2024

(54) RETRIEVAL-BASED DIALOGUE SYSTEM WITH RELEVANT RESPONSES

(71) Applicant: Robert Bosch GmbH, Stuttgart (DE)

(72) Inventors: Bingqing Wang, San Jose, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 636 days.

(21) Appl. No.: 17/218,734

(22) Filed: Mar. 31, 2021

(65) Prior Publication Data

US 2022/0318311 A1 Oct. 6, 2022

(51) Int. Cl.
*G06F 16/9032* (2019.01)
*G06F 16/903* (2019.01)
*G06F 16/9038* (2019.01)
*G06N 20/00* (2019.01)

(52) U.S. Cl.
CPC .. *G06F 16/90332* (2019.01); *G06F 16/90335* (2019.01); *G06F 16/9038* (2019.01); *G06N 20/00* (2019.01)

(58) Field of Classification Search
None
See application file for complete search history.

(56) References Cited

U.S. PATENT DOCUMENTS 10,664,527 B1 * 5/2020 Henderson .......... G06F 16/3347
2020/0279556 A1 * 9/2020 Gruber ................ G06F 16/3344

OTHER PUBLICATIONS

Mu et al., "The Design of Human-Robot Spatial Cognition Interaction System," 2016 International Conference on Information System and Artificial Intelligence (ISAI), IEEE, Jun. 24, 2016, XP033042769, DOI 10.1109/ISAI.2016.0085, pp. 370-374.
Sakata et al. FAQ Retrieval using Query-Question Similarity and BERT-based Query-Answer Relevance. Proceedings of 42nd SIGIR. 2019. pp. 1113-1116.
Vaswani et al. Attention Is All You Need. Proceedings of NIPS. 2017. pp. 5998-6008.
Reimers et al. Sentence-BERT Sentence Embeddings using Siamese BERT-Networks. Proceedings of EMNLP. 2019. pp. 3982-3992.
Cer et al. Universal Sentence Encoder. In EMNLP 2018. 7 pages.
Scholkopf et al. New Support Vector Algorithms. Neural Computation, 12(5), pp. 1207-1245.
Radford et al. Language Models are Unsupervised Multitask Learners. OpenAI blog, 1(8), 9. 24 pages.

* cited by examiner

*Primary Examiner* — Antim G Shah
(74) *Attorney, Agent, or Firm* — Kathy Takeguchi; Maginot, Moore & Beck LLP

(57) ABSTRACT

A computer-implemented system and method relate to natural language processing. A candidate is selected based on a query. The candidate includes a question and an answer to that question. The candidate is classified as belonging to a class. The class indicates that the candidate is relevant to the query. The class is selected from among a group of classes, which includes at least that class and another class. The another class indicates that the candidate has the answer to the query. Upon classifying the candidate as belonging to the class, a machine learning system is configured to generate a relevant response for the query upon receiving the query and the question as input data. The relevant response provides information associated with a keyword of the question that is not contained in the query.

19 Claims, 9 Drawing Sheets

RETRIEVAL-BASED DIALOGUE SYSTEM WITH RELEVANT RESPONSES

FIELD

This disclosure relates generally to computer-implemented systems and methods for natural language processing.

BACKGROUND

There are some computer systems that include retrieval-based dialogue systems. These retrieval-based dialogue systems are configured to provide answers to users upon receiving questions as inputs. In general, these retrieval-based dialogue systems retrieve question-answer pairs based on the inputs. In addition, these retrieval-based dialogue systems are configured to provide only answers, which are extracted from question-answer pairs that are selected according to rankings of the question-answer pairs based on the inputs. Although such dialogue systems may be helpful in some instances, these retrieval-based dialogue systems may fail to meet the information needs of users even though these retrieval-based dialogue systems possess information that may be helpful to those users.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes obtaining a query. The method includes generating a first similarity score for a question-answer pair based on a first similarity determination between the query and the question-answer pair. The question-answer pair includes (i) a question and (ii) an answer to the question. The method includes identifying the question-answer pair as a candidate to address the query based on the first similarity score. The method includes generating a second similarity score based on a second similarity determination between the query and at least one predetermined scope of the candidate, where the at least one predetermined scope of the candidate is derived from other versions of the candidate. The method includes generating classification data to indicate that the candidate is relevant to the query based on a combined similarity score that takes into account the first similarity score and the second similarity score. The method includes providing the query and the question as input to a machine learning system based on the classification data. The method includes generating, via the machine learning system, a relevant response. The relevant response provides information associated with a keyword of the question that is not contained in the query. The method includes generating output data to respond to the query. The output data includes at least the relevant response.

According to at least one aspect, a data processing system includes at least a non-transitory computer readable medium and a processor. The non-transitory computer readable medium includes computer readable data that, when executed, is configured to implement a dialogue system. The processor is operably connected to the non-transitory computer readable medium to execute the computer readable data to implement the dialogue system. The processor is configured to obtain a query. The processor is configured to generate a first similarity score for a question-answer pair based on a first similarity determination between the query and the question-answer pair. The question-answer pair includes (i) a question and (ii) an answer to the question. The processor is configured to identify the question-answer pair as a candidate to address the query based on the first similarity score. The processor is configured to generate a second similarity score based on a second similarity determination between the query and at least one predetermined scope of the candidate, where the at least one predetermined scope of the candidate is derived from other versions of the candidate. The processor is configured to generate classification data to indicate that the candidate is relevant to the query based on a combined similarity score that takes into account the first similarity score and the second similarity score. The processor is configured to provide the query and the question as input to a machine learning system based on the classification data. The processor is configured to generate, via the machine learning system, a relevant response. The relevant response provides information associated with a keyword of the question that is not contained in the query. The processor is configured to generate output data to respond to the query. The output data includes at least the relevant response.

According to at least one aspect, a computer-implemented method includes obtaining a query. The method includes selecting a candidate based on the query. The candidate includes (i) a question and (ii) an answer to the question. The method includes classifying the candidate into a class that indicates that the candidate is relevant to the query from among a group of classes that includes at least the class and another class. The another class indicates that the candidate has the answer to the query. The method includes generating, via a machine learning system, a relevant response to the query upon receiving input data that includes at least the query and the question. The relevant response provides information associated with a keyword of the question that is not contained in the query. The method includes generating output data to respond to the query. The output data includes at least the relevant response.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
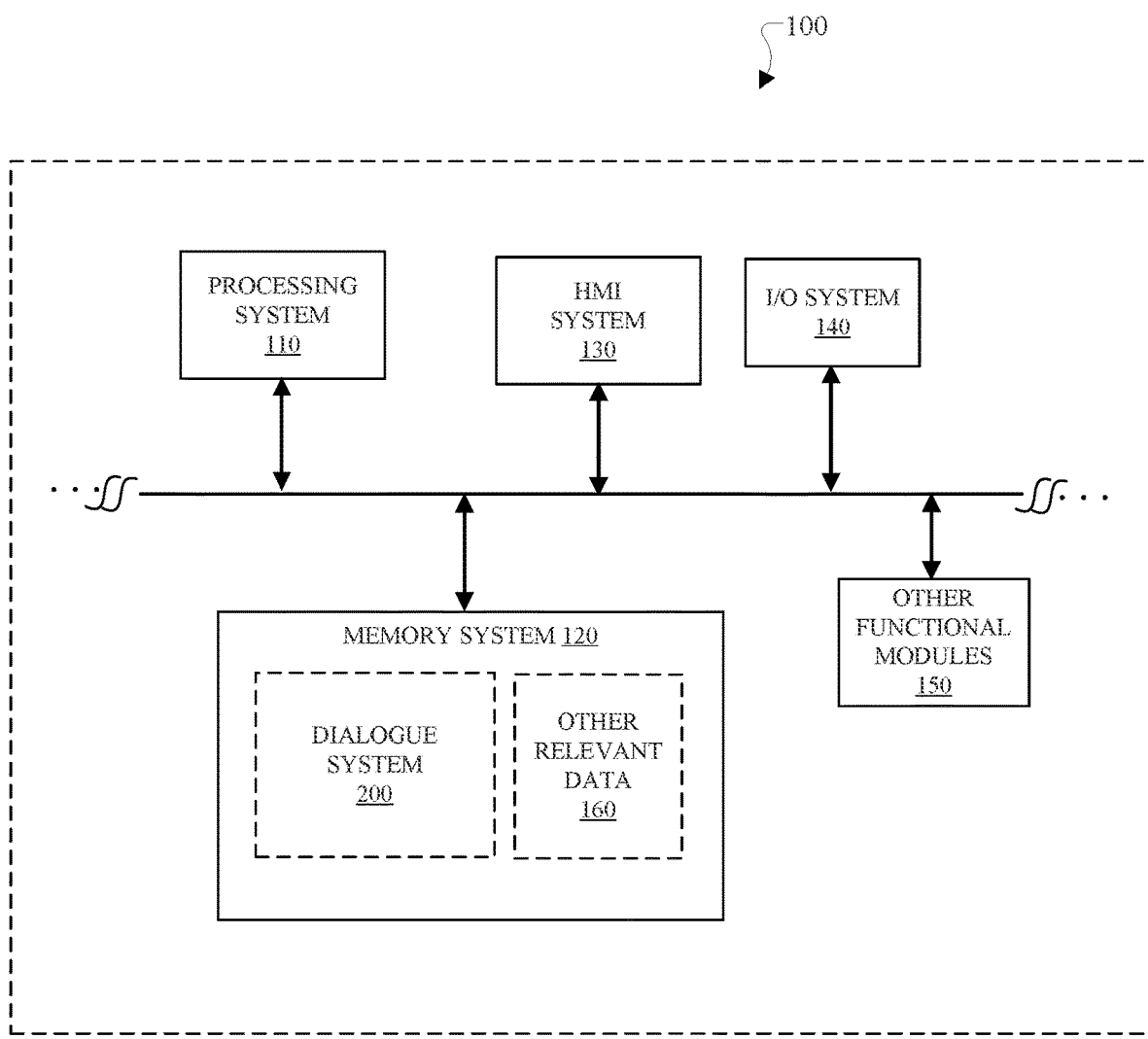
FIG. 1 is a diagram of an example of a system that includes a dialogue system according to an example embodiment of this disclosure.

FIG. 1 is a diagram of an example of a system 100 with a dialogue system 200 for responding to queries according to an example embodiment. The system 100 includes at least a processing system 110. The processing system 110 includes at least one processor. For example, the processing system 110 includes an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to execute the dialogue system 200, as described herein.

The system 100 includes at least a memory system 120, which is operatively connected to the processing system 110. In an example embodiment, the memory system 120 includes at least one non-transitory computer readable medium, which is configured to store and provide access to various data to enable at least the processing system 110 to perform the operations and functions of the dialogue system 200, as disclosed herein. In an example embodiment, the memory system 120 comprises a single computer readable storage device or a plurality of computer readable storage devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and any combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least the dialogue system 200 and other relevant data 160, which are stored thereon and accessible therefrom. The dialogue system 200 includes computer readable data that, when executed by the processing system 110, is configured to generate a system response 20 upon receiving a query 10 as input data. The computer readable data includes instructions, code, routines, various related data, any suitable software component/technology, or any number and combination thereof. The dialogue system 200 and/or the other relevant data 160 may include training data, which is used to train, test, and develop the machine learning systems described herein. The dialogue system 200 and/or other relevant data 160 may also include various annotations, various loss data, various parameter data, as well as any related data that enables the dialogue system 200 to be trained, executed, or both trained and executed to perform the functions as described herein while meeting certain performance criteria. The other relevant data 160 also includes various data (e.g. operating system, etc.), which enables the system 100 to perform the functions as discussed herein.

In an example embodiment, as shown in FIG. 1, the system 100 is configured to include at least one human machine interface (HMI) system 130. The HMI system 130 includes at least one user interface, at least one HMI device, or any number of combination thereof. For example, the HMI system 130 may include a visual user interface, an auditory user interface, a tactile user interface, any suitable user interface, or any number and combination thereof. The HMI system 130 is operable to communicate with the I/O system 140. The HMI system 130 is also operable to communicate with one or more other components (e.g., processing system 110, memory system 120, etc.) of the system 100. More specifically, for example, the processing system 110 is configured to obtain or extract a query 10 directly or indirectly from the HMI system 130, the memory system 120, and/or the I/O system 140. In response to the query 10, the processing system 110 is configured to provide the I/O system 140 and/or the HMI system 130 with a system response 20, which is generated via the dialogue system 200. The I/O system 140 and/or HMI system 130 are configured to provide output data, which includes the system response 20, to the user.

In addition, the system 100 includes other components that contribute to the development or employment of the dialogue system 200. For example, the I/O system 140 may include an I/O interface and may include one or more I/O devices (e.g., microphone, keyboard device, touch display device, microphone, mouse, speaker device, etc.). Also, the system 100 includes other functional modules 150, such as any appropriate hardware technology, software technology, or combination thereof that assist with or contribute to the functioning of the system 100. For example, the other functional modules 150 include communication technology that enables components of the system 100 to communicate with each other as described herein. Accordingly, the system 100 is configured to provide training to the machine learning systems of the dialogue system 200. The system 100 is also configured to deploy/employ the dialogue system 200 for use in another system (e.g. FIG. 7). The system 100 is also configured to employ and run the dialogue system 200 for real-time use.

Figure 2A:
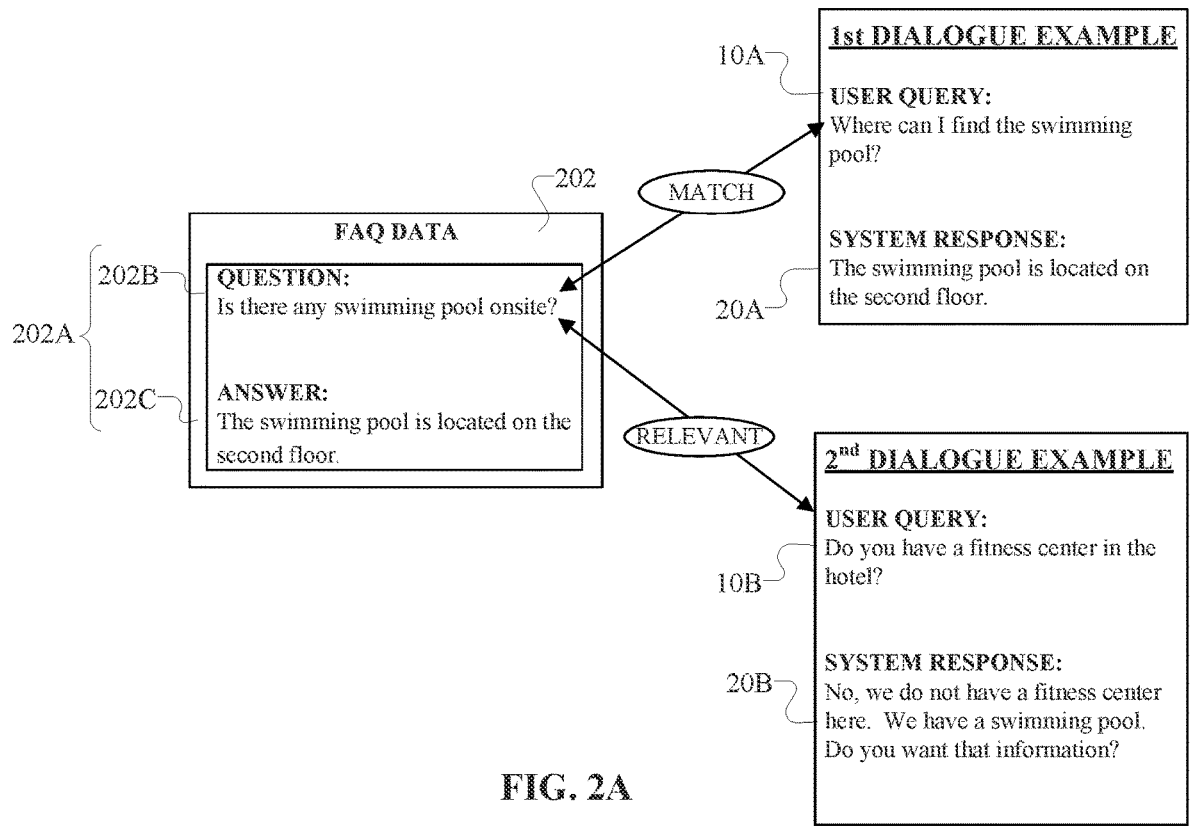
FIG. 2A is a conceptual diagram of non-limiting examples of dialogue data based on the system of FIG. 1 according to an example embodiment of this disclosure.

FIG. 2A shows non-limiting examples of various dialogues that are handled by the dialogue system 200 according to an example embodiment. In these non-limiting examples, each dialogue includes a query 10 and a system response 20. More specifically, in FIG. 2A, the dialogue system 200 is configured to receive or obtain a query 10, for instance, from a user. Upon receiving the query 10, the dialogue system 200 is configured to reference a frequently asked questions (FAQ) data source 202 in the memory system 120 to address the query 10. The FAQ data source 202 includes question-answer pairs. Each question-answer pair includes a question and an answer to that question. The dialogue system 200 is configured to evaluate one or more question-answer pairs based on the query 10.

Referring to FIG. 2A, as a non-limiting example, the system 100 is configured to handle a case in which the dialogue system 200 deems a particular question-answer pair 202A to be classified as a "match" with respect to a user query 10A based at least on a combined similarity assessment. More specifically, for example, the system 100 may receive input, which includes the user query 10A of "Where can I find the swimming pool?" Upon receiving this user query 10A, the dialogue system 200 is configured to determine that a particular question-answer pair 202A (Question: Is there a swimming pool onsite?; Answer: The swimming pool is located on the second floor.) is classified as a "match" with respect to the user query 10A. For example, in this case, the user query 10A and the question-answer pair 202A are deemed a "match" for exhibiting a first predetermined level of similarity (or a highest level of similarity) based on the combined similarity assessment as determined by equation 4. Based on the "match" relationship status and classification, the dialogue system 200 is configured to determine that the answer 202C of the question-answer pair 202A is a valid response for this particular user query 10A. In this regard, upon classifying the question 202B of the question-answer pair 202A as being a "match" with respect to the user query 10A, the dialogue system 200 is configured to extract the answer 202C from that question-answer pair 202A and provide a system response 20A, which includes that extracted answer 202C. In FIG. 2A, for instance, this non-limiting interaction between the user and the dialogue system 200 is conveyed in the first dialogue example, as follows:

User Query: Where can I find the swimming pool?
System Response: The swimming pool is located on the second floor.

As another non-limiting example, the system 100 is configured to handle a case in which the dialogue system 200 deems the question-answer pair 202A to be classified as "relevant" with respect to another user query 10B based at least on a combined similarity assessment. More specifically, for example, the system 100 may receive input, which includes the user query 10B of "Do you have a fitness center in the hotel?" Upon receiving this user query 10B, the dialogue system 200 is configured to determine that a particular question-answer pair 202A (Question: Is there a swimming pool onsite?, Answer: The swimming pool is located on the second floor.) is classified as being "relevant" with respect to the user query 10B. For example, in this case, the user query 10B and the question-answer pair 202A are deemed "relevant" for exhibiting a second predetermined level of similarity based on a combined similarity assessment as determined by equation 4. The second predetermined level of similarity, which corresponds to the "relevant" classification, is less than the first predetermined level of similarity, which corresponds to the "match" classification. Based on the "relevant" relationship status and classification, the dialogue system 200 is configured to determine that the question-answer pair 202A includes relevant data (or alternative information) that relates to the user query 10B. For example, in this case, the relevant data (or alternative information) relates to the swimming pool (which is included in the question-answer pair 202A) instead of the requested data of the fitness center (which is included in the query 10B).

In this case, the dialogue system 200 is configured to generate the system response 20B, which includes at least a first part and a second part. The first part includes an acknowledgement that the question-answer pair 202A is not a "match" based on the combined similarity assessment. In FIG. 2A, for instance, the first part includes at least a negative confirmation ("No, we do not have a fitness center here") to indicate that the dialogue system 200 could not locate a "match" with one or more of the question-answer pairs in the FAQ data source 202. Meanwhile, the second part includes a relevant response to indicate that the selected question-answer pair includes relevant data with respect to the user query 10B. For example, in FIG. 2A, the second part includes at least a relevant response ("We have a swimming pool. Do you want that information?"), which refers to and presents the relevant data from the question-answer pair 202A. More specifically, in FIG. 2A, this non-limiting interaction between the user and the dialogue system 200 is conveyed in the second dialogue example, as follows:

User Query: Do you have a fitness center in the hotel?
System Response: No, we do not have a fitness center here. We have a swimming pool. Do you want that information?

Furthermore, as yet another non-limiting example (not shown in FIG. 2A), the system 100 is configured to handle a case in which the dialogue system 200 deems the question-answer pair 202A to be classified as "irrelevant" with respect to another query 10C of "I need to withdraw some cash?" (FIG. 2B) based at least on a combined similarity assessment. For example, in this case, the query 10 and the question-answer pair 202A are deemed "irrelevant" for exhibiting a third predetermined level of similarity based on the combined similarity assessment as determined by equation 4. The third predetermined level of similarity, which corresponds to the "irrelevant" classification, is less than the second predetermined level of similarity, which corresponds to the "relevant" classification. In addition, the third predetermined level of similarity, which corresponds to the "irrelevant" classification, is less than the first predetermined level of similarity, which corresponds to the "match" classification. In this case, the dialogue system 200 is configured to indicate that the selected question-answer pair 202A is classified as "irrelevant" and should be discarded such that the question-answer pair 202A is not used in addressing that query 10C.

Figure 2B:
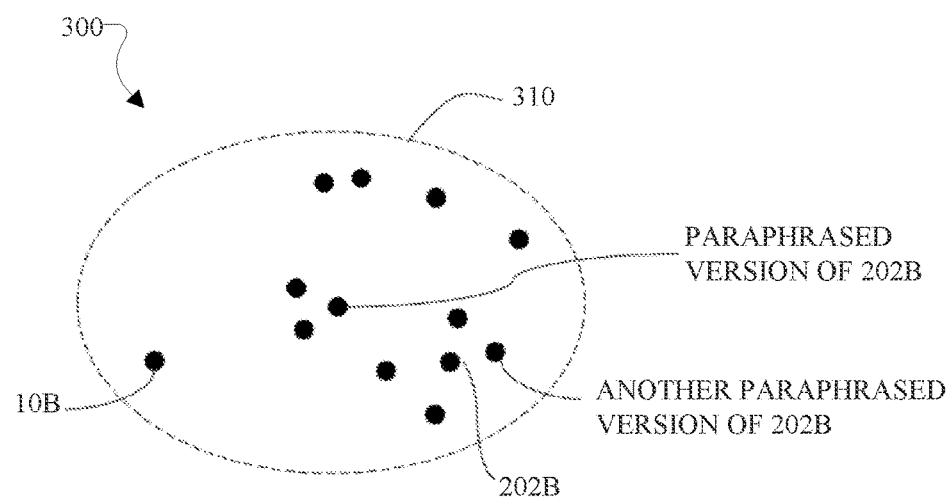
FIG. 2B is a conceptual diagram of non-limiting examples of user queries with respect to a classification boundary in an embedding space according to an example embodiment of this disclosure.

FIG. 2B is a conceptual diagram that illustrates some aspects that relate to the generation of the system response 20B for the second dialogue example of FIG. 2A. In this regard, during the process of generating a system response 20 for a query 10, the dialogue system 200 is advantageously configured to compute a combined similarity assessment, via equation 4, that involves at least (i) a similarity evaluation of the query 10 with respect to a candidate (i.e. a selected question-answer pair retrieved from the FAQ data source 202) and (ii) a similarity evaluation of the query 10 with respect to classification boundaries relating to the candidate in at least one embedding space 300. As an example, the dialogue system 200 is configured to perform a similarity evaluation of the query 10 with respect to the candidate using an embedding index 214 (FIG. 4B). Also, the dialogue system 200 is configured to perform a similarity evaluation of the query 10 with respect to classification boundaries, which are derived from paraphrased versions of the candidate. These features are advantageous in enabling the dialogue system 200 to determine if the query 10 is at a sufficient level of similarity with respect to a scope of the candidate of the FAQ data source 202 to thereby offer and/or provide relevant and useful data from the candidate to the user when there is no "match" in the FAQ data store 202.

FIG. 2B illustrates a non-limiting example of a classification boundary 310, which relates to a question 202B of a candidate. The candidate is a selected question-answer pair 202A, which is retrieved from the FAQ data source 202. The classification boundary 310 is defined within at least one embedding space 300. In FIG. 2B, the classification boundary 310 is provided by at least one machine learning system. In this example, the machine learning system is configured as a one-class classifier that uses at least one classification boundary 310 to determine whether input data (e.g. a query 10) is classified as being within the scope of the question 202B or outside the scope of the question 202B. For instance, the machine learning system includes at least one support vector machine 500 (FIGS. 5A-5B), which is trained with paraphrased versions of at least that question 202B. The machine learning system uses the classification boundary 310, which is learned during training to determine if the input data (e.g., query 10) is classifiable as having (i) a sufficient level of similarity with respect to the question 202B of the candidate or (ii) an insufficient level of similarity with respect to the question 202B of the candidate. The machine learning system is trained to classify these paraphrased versions as having a sufficient level of similarity with respect to the question 202B ("Is there any swimming pool onsite?). For instance, "Can I swim at the hotel?" is a non-limiting example of a paraphrased version of the question 202B. Also, "Do you offer water sports at the hotel?" is another example of a paraphrased version of the question 202B. As shown in FIG. 2B, each of the paraphrased versions fall within the scope of the question 202B and reside within the classification boundary 310.

In FIG. 2B, for instance, the dialogue system 200 determines that the user query 10B of "Do you have a fitness center in the hotel?" resides within the bounds of the classification boundary 310 of the embedding space 300. In this regard, the dialogue system 200 classifies the user query 10B ("Do you have a fitness center in the hotel?") as being within the scope of the question 202B ("Is there any swimming pool onsite?"), thereby indicating that the user query 10B has a sufficient level of similarity with respect to at least the question 202B. The dialogue system 200 is configured to account for this similarity evaluation with respect to the classification boundary 310 when determining the combined similarity assessment via equation 4.

In contrast, the dialogue system 200 determines that another query 10C of "I need to withdraw some cash?" resides outside of the bounds of the classification boundary 310 of the embedding space 300. In this case, as shown in FIG. 2B, the dialogue system 200 classifies the query 10C of "I need to withdraw some cash?" as being outside of the scope of the question 202B ("Is there any swimming pool onsite?"), thereby indicating that the query 10C has an insufficient level of similarity with respect to at least the question 202B. The dialogue system 200 is configured to account for this similarity evaluation with respect to the classification boundary 310 when determining the combined similarity assessment via equation 4.

As discussed above, FIG. 2B provides a non-limiting example of the classification boundary 310 relating to the question 202B of the question-answer pair 202A. In addition, although not shown in a conceptual diagram like that of FIG. 2B, the dialogue system 200 is also configured to determine whether or not the query 10 is classified as being within a scope of the answer 202C of the question-answer pair 202A. In this regard, the dialogue system 200 is configured to make this determination by at least one classification boundary provided by at least one machine learning system. For example, the machine learning system is configured as a one-class classifier that uses at least one classification boundary to determine whether input data (e.g. a query 10) is classified as being within the scope of the answer 202C or outside the scope of the answer 202C. For instance, the machine learning system includes at least one support vector machine 502 (FIGS. 5A-5B), which is trained with paraphrased versions of at least that answer 202C. The machine learning system uses a classification boundary, which is learned during training to determine if the input data (e.g., query 10) is classifiable as having (i) a sufficient level of similarity with respect to the answer 202C of the candidate or (ii) an insufficient level of similarity with respect to the question 202C of the candidate. The dialogue system 200 takes into account these determinations between the query 10 and scopes of the candidate as expressed in equation 3 upon determining the combined similarity assessment via equation 4.

Figure 3:
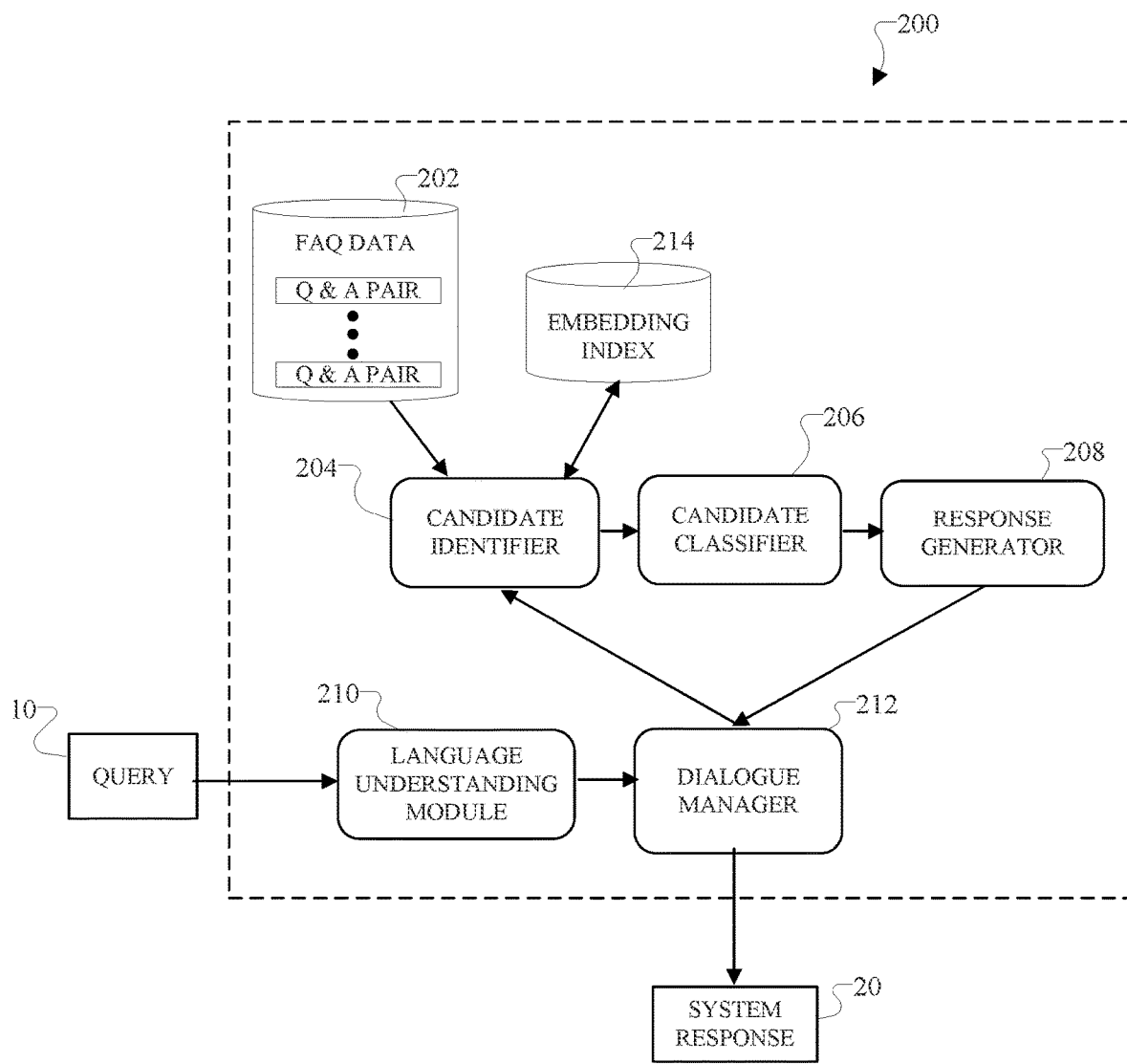
FIG. 3 is a diagram of an example of a framework for the dialogue system of FIG. 1 according to an example embodiment of this disclosure.

FIG. 3 is a conceptual diagram that shows an architecture of the dialogue system 200 according to an example embodiment. As shown in FIG. 3, the dialogue system 200 includes a candidate identifier 204, a candidate classifier 206, a response generator 208, a language understanding module 210, and a dialogue manager 212. In addition, the dialogue system 200 is configured to include the FAQ data source 202 and an embedding index 214. Moreover, as a general overview, in FIG. 3, the dialogue system 200 is configured to receive a query 10 as input data and generate a system response 20 as output data.

The dialogue system 200 is configured to receive input data from the I/O system 140, the HMI system 130, the memory system 120, any suitable means, or any combination thereof. The input data may include text data or other data (e.g., speech detection, motion detection, etc,), which is later converted and/or translated into text data. The text data may include a number of words, which relate to a query 10. As a non-limiting example, for instance, the dialogue system 200 may receive the input data of "Do you have a fitness center in the hotel?" as text data (or as an utterance that is converted into text data).

The language understanding module 210 is configured to process the input data to generate or extract query data. The language understanding module 210 is configured to provide a query 10 based on the query data to the candidate identifier 204. For instance, upon receiving the aforementioned input data regarding the fitness center, the language understanding module 210 is configured to process this input data and provide corresponding text data as a query 10 to the candidate identifier 204 via the dialogue manager 212. The candidate identifier 204 is configured to receive the query 10 from the dialogue manager 212 and generate a set of candidates that relate to the query 10. Also, as shown in FIG. 3, the candidate identifier 204 is configured to provide the set of candidates to the candidate classifier 206.

Figure 4A:
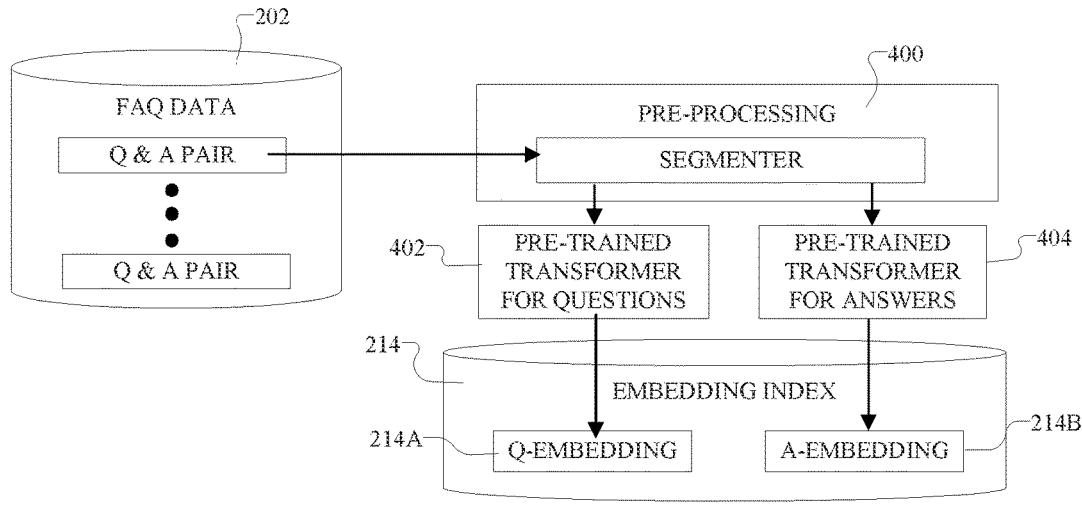
FIG. 4A is a conceptual diagram that shows aspects of developing the candidate identifier of FIG. 3 according to an example embodiment of this disclosure.
Figure 4B:
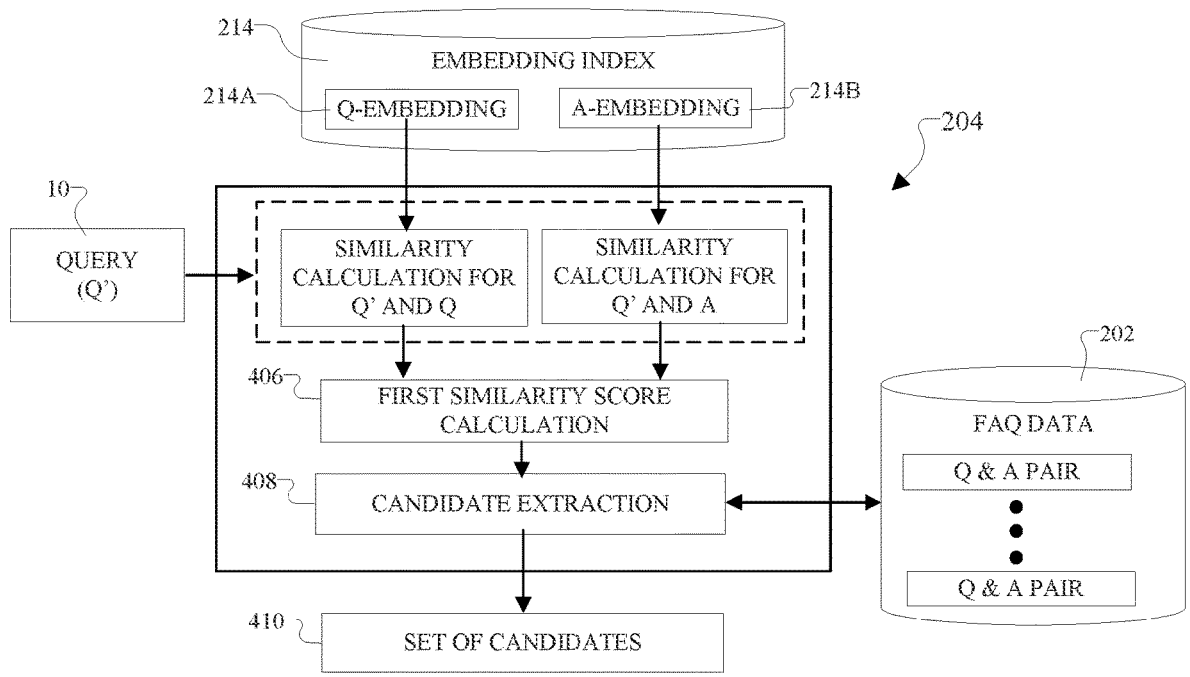
FIG. 4B is a conceptual diagram that shows aspects of running the candidate identifier of FIG. 3 according to an example embodiment of this disclosure.

FIG. 4A and FIG. 4B show various aspects of the candidate identifier 204 according to an example embodiment. More specifically, FIG. 4A shows aspects relating to the development of the candidate identifier 204 while FIG. 4B shows aspects relating to testing and/or actual use of the candidate identifier 204. The candidate identifier 204 includes an embedding index 214, which is generated based on question-answer pairs. For example, the embedding index 214 may correspond to the FAQ data source 202, which includes a suitable number of question-answer pairs for the application of the dialogue system 200. More specifically, the embedding index 214 is an indexing data structure, which indexes a set of vectors and which uses algorithms to perform a similarity search (e.g., dot product vector comparison, cosine similarity function, etc.) on the set of vectors with respect to an input vector (e.g., query 10 in vector form).

Referring to FIG. 4A, the development of the embedding index 214 involves obtaining a question-answer pair from the FAQ data source 202. A pre-processing module 400 is configured to pre-process the question-answer pair for the machine learning systems. In FIG. 4A, the machine learning systems include transformer 402 and transformer 404. For instance, the pre-processing module 400 is configured to segment the textual content into sentences. Each sentence of the question component is fed into a pre-trained sentence transformer 402 to obtain the sentence embedding. Also, each sentence of the answer component is ted into a pre-trained sentence transformer 404 to obtain the sentence embedding. In this regard, for example, for a question or an answer that is relatively short in length and/or comprises a single sentence, the processing system 110 is configured to use the sentence embedding directly. Also, for a question or an answer that is relatively long and/or comprises multiple sentences, the processing system 110 is configured to determine and use the average of the sentence embedding. Upon being generated, the question-embedding data and the answer-embedding data are then used in the embedding index 214. In this regard, the embedding index 214 is configured to include the question-embedding and the answer-embedding while providing faster retrieval thereof. As shown in at least FIG. 4A, the embedding index 214 includes first embedding index data 214A for questions (e.g., Q-embedding) and second embedding index data 214B for answers (e.g., A-embedding).

Referring to FIG. 4B, after being developed and upon being employed, the candidate identifier 204 is configured to receive input, which includes the query 10 (represented as Q'). Upon receiving the query 10, the processing system 110 is configured to use the embedding index 214 to determine one or more of the most similar embeddings with respect to the query 10. In addition, the processing system 110 is configured to provide similarity scores (e.g., Euclidean distances) corresponding to the one or more of the most similar embeddings with respect to the query 10. For example, the candidate identifier 204 is configured to use the first embedding index data 214A to determine one or more of the most similar questions in relation to the query 10. Also, the candidate identifier 204 is configured to use the second embedding index data 214B to determine one or more of the most similar answers in relation to the query 10.

The candidate identifier 204 is configured to determine a first similarity score with respect to the query 10 and an identified question-answer pair. For example, the first similarity score is determined via. $Sim_{faq}$, as expressed in Equation 1. More specifically, the candidate identifier 204 is configured to determine a similarity score (Sim(Q', Q)) between the query 10 and the question of the question-answer pair via the first embedding index data 214A. In this regard, Sim(Q', Q)) represents a similarity function that determines the similarity between the query 10 (represented by Q') and the question (represented by Q), which is extracted from the question-answer pair. The candidate identifier 204 is also configured to determine a similarity score (Sim(Q', A)) between the query 10 (represented by Q') and the answer (represented by A) of that same question-answer pair via the second embedding index data 214B. In this regard, Sim(Q', A)) represents a similarity function that determines the similarity between the query 10 (represented by Q') and the answer (represented by A), which is extracted from the question-answer pair. In addition, the candidate identifier 204 is configured to perform a first similarity score calculation 406 to calculate a first similarity score ($Sim_{faq}$) for a question-answer pair that indicates a similarity of the query 10 with respect to that question-answer pair by combining the similarity score (Sim(Q', Q)) and the similarity score (Sim(Q', A)), as expressed in equation 1, where ∝ represents a parameter that has a value of 0, a value of 1, or a value between 0 and 1.

$$Sim_{faq} = \alpha * Sim(Q', Q) + (1-\alpha) * Sim(Q', A) \qquad \text{[Equation 1]}$$

The candidate identifier 204 is configured to perform candidate extraction 408 to select and extract a set of candidates 410 from among the question-answer pairs based on the similarity scores with respect to at least one predetermined criterion. For example, the candidate identifier 204 is configured to select and extract a set of question-answer pairs from the FAQ data source 202 that show the greatest similarity with respect to the query 10 as the set of candidates. In this regard, for instance, the candidate identifier 204 is configured to make the selection by comparing each similarity score ($Sim_{faq}$) with a predetermined threshold value. As another example, for instance, the candidate identifier 204 is configured to retrieve and/or select a set of candidates from the FAQ data source 202 based on a ranking of the similarity scores. In this regard, for instance, the candidate identifier 204 is configured to select the set of candidates that have ranks that correspond to predetermined levels (e.g., greatest levels) of similarity with respect to the query 10. Upon selecting the set of candidates, the candidate identifier 204 is configured to provide this set of candidates to the candidate classifier 206.

Figure 5A:
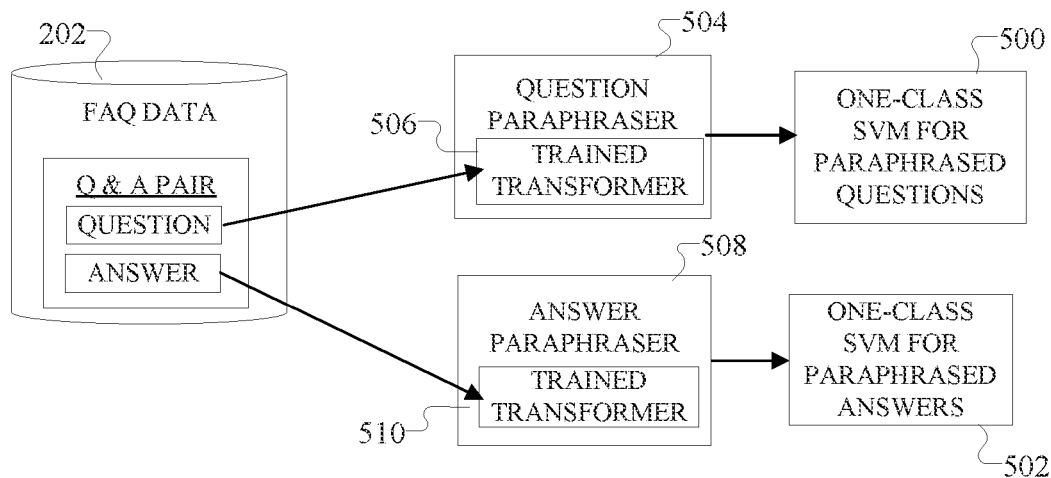
FIG. 5A is a conceptual diagram that shows aspects of developing the candidate classifier of FIG. 3 according to an example embodiment of this disclosure.
Figure 5B:
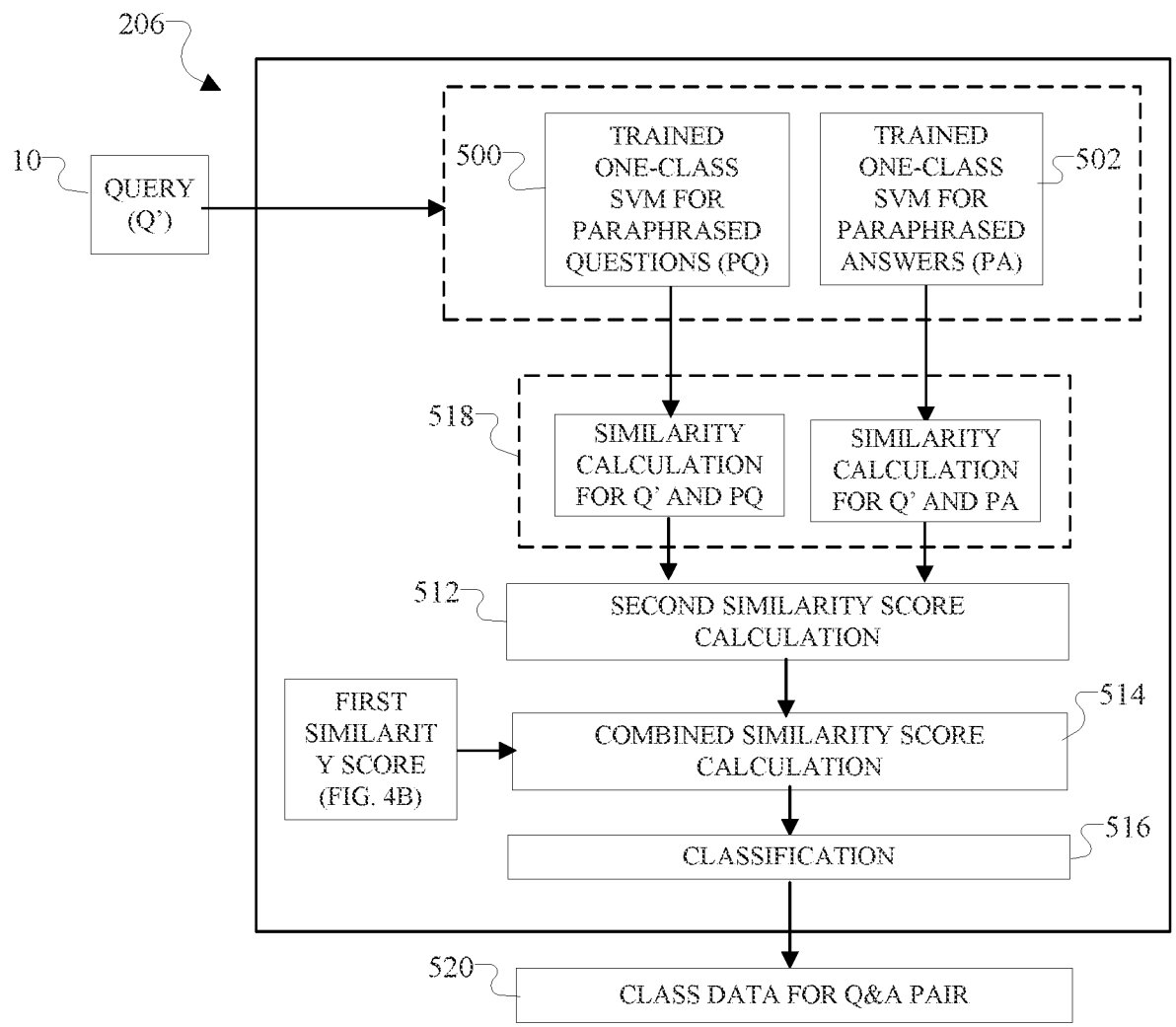
FIG. 5B is a conceptual diagram that shows aspects of running the candidate classifier of FIG. 3 according to an example embodiment of this disclosure.

FIG. 5A and FIG. 5B show various aspects of the candidate classifier 206 according to an example embodiment. More specifically, FIG. 5A shows aspects relating to the development of the candidate classifier 206 while FIG. 5B shows aspects relating to testing and/or the actual use of the candidate classifier 206. The candidate classifier 206 includes a first support vector machine (SVM) 500, which is trained on paraphrased versions of a question from a selected question-answer pair. The candidate classifier 206 also includes a second SVM 502, which is trained on paraphrased versions of an answer from the selected question-answer pair. The first SVM 500 includes at least one supervised learning model, which is trained and configured for a single class relating to similar questions. The second SVM 502 includes at least one supervised learning model, which is trained and configured for a single class relating to similar answers. In this regard, for every question-answer pair in the FAQ data source 202, the candidate classifier 206 is configured with machine learning systems, which include one SVM associated with the question and another SVM associated with the answer.

Referring to FIG. 5A, the development of the first SVM 500 and the second SVM 502 involves pre-processing data from the FAQ data source 202. More specifically, the processing system 110 is configured to select a question-answer pair from the FAQ data source 202. The processing system 110 is configured, via a question paraphraser 504, to generate paraphrased versions of the question from that question-answer pair. In this regard, the question paraphraser 504 is advantageously configured to enlarge the training set data for the first SVM 500. The question paraphraser 504 may be implemented via at least one machine learning system, such as a transformer 506 that includes at least one artificial neural transformer model, which is trained on a dataset that includes paraphrased questions. In this regard, for example, the transformer 506 includes a generative pre-trained language model. The processing system 110 is configured, via an answer paraphraser 508, to generate paraphrased versions of the answer from that question-answer pair. In this regard, the answer paraphraser 508 is advantageously configured to enlarge the training set data for the second SVM 502. The answer paraphraser 508 may be implemented via at least one machine learning system, such as a transformer 510 that includes at least one artificial neural transformer model, which is trained on a dataset that includes paraphrased answers. In this regard, for example, the transformer 510 includes a generative pre-trained language model.

After the training set is enlarged by the question paraphraser 504, the processing system 110 is configured to provide the appropriate training data to the first SVM 500. For example, the first SVM 500 is configured to receive one-class training data, which includes various paraphrased versions of the question of that question-answer pair. More specifically, for instance, the first SVM 500 is configured to receive at least a paraphrased version of the question as input and provide the embedding for that input. Further, the first SVM 500 is configured to learn the contour of training instances in the embedding space. Accordingly, with the first SVM 500 trained on the embedding space, the processing system 110 is configured to determine a similarity of the input with respect to a set of paraphrased questions (e.g. rephrased questions) by calculating a distance of the input to a first support vector boundary (e.g., a classification boundary based on paraphrased questions) learned from the training. The processing system 110 is further configured to normalize this distance by logistic regression.

In addition, the second SVM 502 is configured to receive one-class training data, which includes various paraphrased versions of the corresponding answers of the question-answer pairs. More specifically, for instance, the second SVM 502 is configured to receive at least a paraphrased version of the answer as input and provide the embedding for that input. Further, the second SVM 502 is configured to learn the contour of training instances in the embedding space. Accordingly, with the second SVM 502 trained on the embedding space, the processing system 110 is configured to determine a similarity of the input with respect to a set of paraphrased answers (e.g., rephrased answers) by calculating a distance of the input to a second support vector boundary (e.g., a classification boundary based on paraphrased answers) learned from the training. The processing system 110 is further configured to normalize this distance by logistic regression.

Referring to FIG. 5B, after being developed and upon being employed, the candidate classifier 206 is configured to receive each candidate from the set of candidates 410 as input. As a general overview, the candidate classifier 206 is configured to classify each candidate. The candidate classifier 206 is configured to provide class data 520 for a candidate based on its classification 516. The candidate classifier 206 is configured to classify each candidate based on its combined similarity score, which is determined based on the first similarity score and the second similarity score. As shown in FIG. 5B, the candidate classifier 206 determines the second similarity score based on one-class similarity calculations 518.

More specifically, in the example shown in FIG. 5B, the candidate classifier 206 includes at least the first SVM 500, which is a single class classifier that relates to a question of the question-answer pair, and the second SVM 502, which is a single class classifier that relates to an answer of the question-answer pair. Also, each of the SVMs 500/502 is used to determine a respective similarity score based on its one-class classifier (OCC) using equation 2, where, x is the embedding of the query 10, svm(x) is the raw output of that SVM model given x as input, and $Sim_{occ\_i}$ is the similarity from the one-class classification normalized to a value of 0, a value of 1, or a value between 0 and 1. Also, the indicator 'i' is set as "Question" to indicate that the similarity score is based on the SVM 500 for questions or set as "Answer" to indicate that the similarity score is based on the SVM 502 for answers.

$$Sim_{occ\_i} = \text{logistic}(svm(x)) = \frac{1}{1 + (\exp(-svm(x)))} \quad \text{[Equation 2]}$$

As aforementioned, the candidate classifier 206 includes (i) the first SVM 500 to determine whether or not the query 10 is within a scope of the question of the question-answer pair and (ii) the second SVM 502 to determine whether or not the query is within a scope of the answer of the question-answer pair. More specifically, as shown in FIG. 5B, the query 10 is provided as input to the first SVM 500 to be evaluated with respect to a scope of the question via a learned classification boundary of the first SVM 500. In this regard, the first SVM 500 has a classification boundary, which is learned and derived from paraphrased versions of the question. Upon generating the raw output via the first SVM 500, the candidate classifier 206 then performs a one-class similarity calculation 518 to calculate a similarity score ($Sim_{occ\_Question}$) using equation 2.

Also, as shown in FIG. 5B, the query 10 is provided as input to the second SVM 502 to be evaluated with respect to a scope of the answer via a learned classification boundary of the second SVM 502. In this regard, the second SVM 502 has a classification boundary, which is learned and derived from paraphrased versions of the answer. Upon generating the raw output via the second SVM 502, the candidate classifier 206 then performs a one-class similarity calculation 518 to calculate a similarity score ($Sim_{occ\_Answer}$) using equation 2.

In addition, the candidate classifier 206 is configured to perform at least a second similarity score calculation 512 to determine the second similarity score ($Sim_{occ}$) via equation 3, where γ represents a parameter that has a value of 0, a value of 1, or a value between 0 and 1. As expressed in equation 3, the second similarity score ($Sim_{occ}$) is computed based on the similarity score ($Sim_{occ\_Question}$) associated with the first SVM 500 and the similarity score ($Sim_{occ\_Answer}$) associated with the second SVM 502 via $$Sim_{occ}=\gamma*Sim_{occ\_Question}+(1-\gamma)*Sim_{occ\_Answer} \quad \text{[Equation 3]}$$

The candidate classifier 206 performs a combined similarity score calculation 514 to obtain a combined similarity score (Sim), as expressed in equation 4. More specifically, the combined similarity score calculation 514 combines the second similarity score ($Sim_{occ}$) with the first similarity score ($Sim_{faq}$). The combined similarity score calculation 514 results in the combined similarity score (Sim), as expressed in equation 4, where β is a pre-set parameter that has a value of 0, a value of 1, or a value between 0 and 1.

$$Sim=\beta*Simm_{faq}+(1-\beta)*Simm_{occ} \quad \text{[Equation 4]}$$

Upon generating the combined similarity score (Sim), the candidate classifier 206 is configured to classify the candidate (i.e., the question-answer pair) with respect to the query 10 based on a comparison of the combined similarity score with threshold criteria. For example, the candidate classifier 206 is configured to classify the candidate in a class that indicates that the candidate is a "match" with respect to the query 10 when the combined similarity score is greater than or equal to 0.9 (i.e., when Sim≥0.9). The candidate classifier 206 is configured to classify the candidate in a class that indicates that the candidate is "relevant" (and not a "match") with respect to the query 10 when the combined similarity score is a value equal to or greater than 0.8 and less than 0.9 (i.e., when 0.8≤Sim<0.9). The candidate classifier 206 is configured to classify the candidate in a class that indicates that the candidate is "irrelevant" with respect to the query 10 when the combined similarity score is a value that is less than 0.8 (i.e., when Sim<0.8). Once the candidate classifier 206 generates class data 520 to indicate a corresponding class for the classification of the candidate based on the combined similarity score, the candidate classifier 206 is configured to provide the class data 520 for that candidate (or a selected question-answer pair) to the response generator 208. The response generator 208 is configured to use at least the query 10, the question-answer pair, and the class data 520 to generate an appropriate system response 20 for the query 10.

Figure 6A:
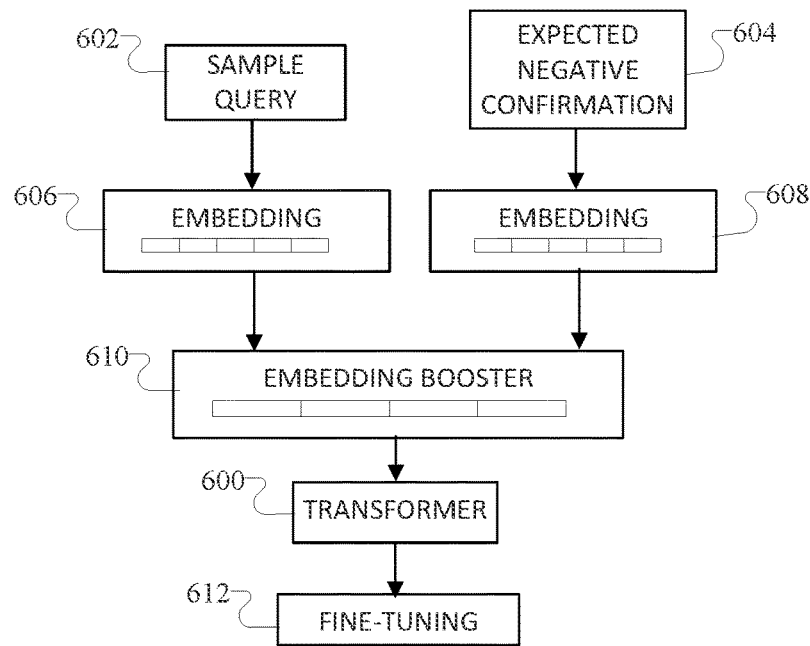
FIG. 6A is a conceptual diagram that shows aspects of training a first part of the response generator of FIG. 3 according to an example embodiment of this disclosure.
Figure 6B:
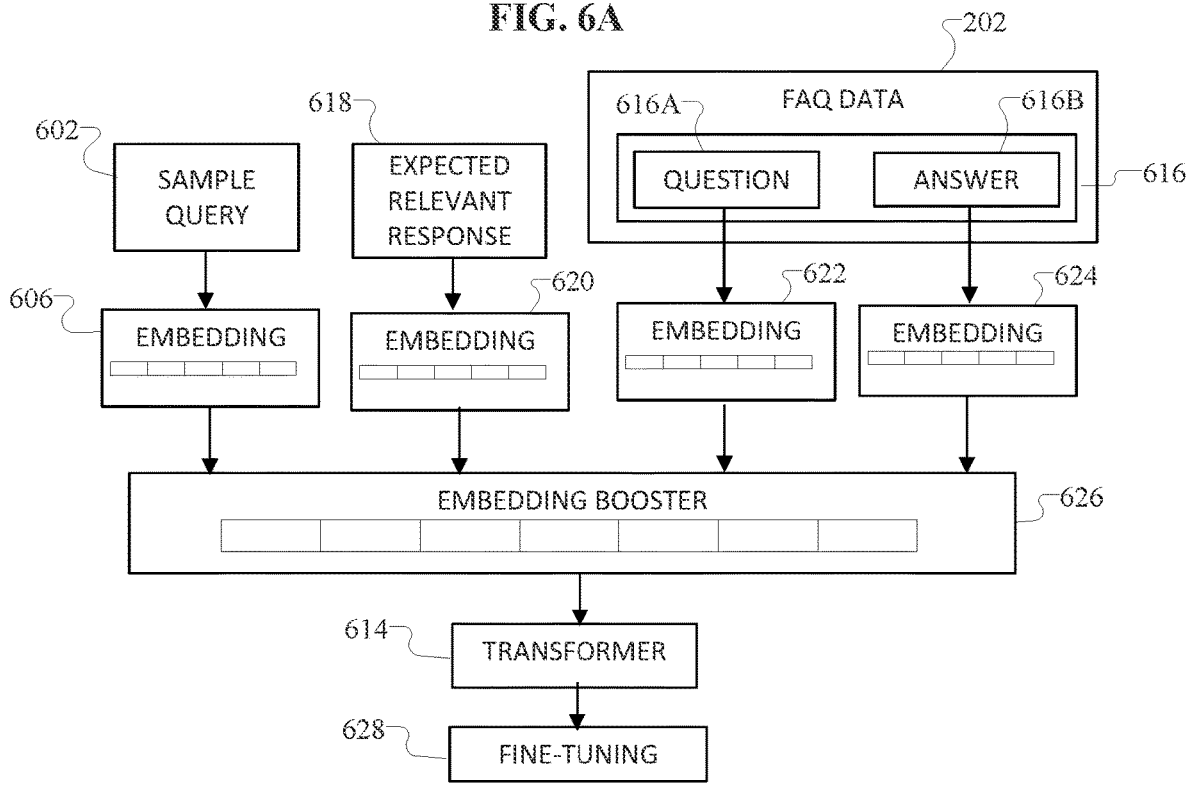
FIG. 6B is a conceptual diagram that shows aspects of training a second part of the response generator of FIG. 3 according to an example embodiment of this disclosure.
Figure 6C:
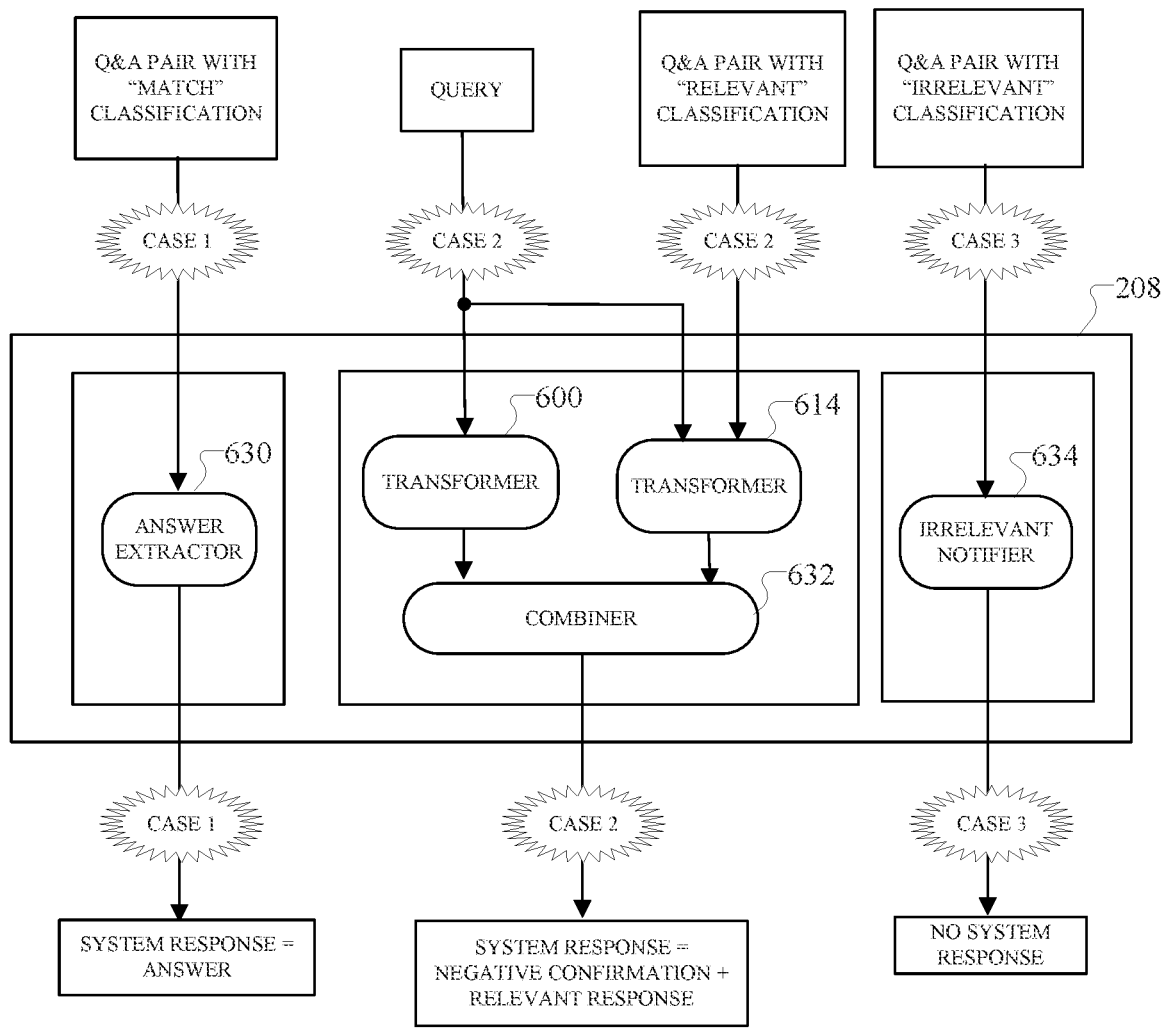
FIG. 6C is a conceptual diagram that shows aspects of running the candidate classifier of FIG. 3 according to an example embodiment of this disclosure.

FIG. 6A, FIG. 6B, and FIG. 6C show various aspects of the response generator 208 according to an example embodiment. More specifically, FIG. 6A shows aspects relating to the development of a first part of the response generator 208. The first part is configured to provide a negative confirmation based on the query 10. In addition, FIG. 6B shows aspects relating to the development of a second part of the response generator 208. The second part is configured to provide a relevant response based on the query 10. Meanwhile, FIG. 6C shows aspects relating to testing and/or actual use of the response generator 208.

Referring to FIG. 6A, the development of the first part of the response generator 208 includes training a machine learning system, such as a transformer 600 (or any suitable machine learning model) to generate a negative confirmation. For example, in FIG. 6A, the transformer 600 includes at least one artificial neural transformer model, which is trained with a relatively large training set of enhanced versions of embeddings ("embedding boosts"). More specifically, the training process includes obtaining a sample query 602 and an expected negative confirmation 604. In this case, the expected negative confirmation 604 includes a reply that directly addresses the sample query 602. For instance, within the system response 20B of FIG. 2A, the negative confirmation is "No, we do not have a fitness center here," which directly addresses the user query 10B ("Do you have a fitness center in the hotel?"). The expected negative confirmation 604 is the desired output data for the transformer 600 when the input data is the sample query 602. Upon obtaining the sample query 602 and the expected negative confirmation 604, the processing system 110 is configured to generate an embedding 606 for the sample query 602 and an embedding 608 for the expected negative confirmation 604.

In addition, the processing system 110 is configured to generate an embedding boost based on the embedding 606 and the embedding 608. For example, in FIG. 6A, the embedding boost is configured to represent at least one or more overlapping similarities between the sample query 602 and the expected negative confirmation 604. For instance, the processing system 110, via an embedding booster 610, is configured to determine common keywords between the sample query 602 and the expected negative confirmation 604. The processing system 110, via the embedding booster 610, is configured to concatenate embeddings for (a) the sample query 602, (b) the expected negative confirmation 604, and (c) common keywords between the sample query 602 and the expected negative confirmation 604. The concatenated embeddings produce an embedding boost, which is used as input data for training the transformer 600. The embedding boost includes at least token embedding, sentence embedding, and positional embedding. As one example, the embedding boost is represented by the following data structure:

[BOS]Input_Text[BRK]Expected_Output[BRK]common_key_word[EOS]

In the above data structure, [BOS] represents the beginning of sentence. Input_Text represents the sample query 602. The Expected_Output represents the expected negative confirmation 604. Common_key_word represents any common keywords between the sample query 602 and the expected negative confirmation 604. Each embedding boost of the training set is then used to train the transformer 600. In addition, the transformer 600 undergoes a fine-tuning process 612 before being employed for use.

Referring to FIG. 6B, the development of the second part of the response generator 208 includes training a machine learning system, such as a transformer 614 (or any suitable machine learning model) to generate a relevant response. For example, in FIG. 6B, the transformer 614 includes at least one artificial neural transformer model, which is trained with a relatively large training set of embedding boosts. More specifically, the training process includes obtaining the sample query 602, a question 616A of a question-answer pair 616, an answer 616B of that same question-answer pair 616, and an expected relevant response 618. In this case, the expected relevant response 618 is a reply that provides or refers to relevant data from the question-answer pair 616. The expected relevant response 618 is the desired output data for the transformer 614 when the input data is the sample query 602. The processing system 110 is configured to generate an embedding 606 for the sample query 602, an embedding 620 for the expected relevant response 618, an embedding 622 for the question 616A of the question-answer pair 616, and an embedding 624 for the answer 616B for that question-answer pair 616.

In FIG. 6B, the embedding boost is configured to represent at least one or more keyword differences between the sample query 602 and the expected relevant response 618. For instance, the processing system 110, via an embedding booster 626, is configured to determine keyword differences between the sample query 602 and the expected relevant response 618. The processing system 110, via the embedding booster 626, is configured to concatetate embeddings for (a) the sample query 602, (b) the expected relevant response 618, (c) keywords found in the sample query 602 but not contained in the question 616A, and (d) keywords found in the question 616A but not contained in the sample query 602. The concatenated embeddings result in an embedding boost, which is used as input data for training the transformer 614. The embedding boost includes at least token embedding, sentence embedding, and positional embedding. As one example, the embedding boost is represented by the following data structure:

[BOS]User_Q[BRK]FAQ_Q[BRK]FAQ_A[BRK]
diff_comp_in_User_Q[BRK]diff_comp_
in_FAQ_Q[EOS]

In the above data structure, [BOS] represents the beginning of sentence. User_Q represents the sample query 602. FAQ_Q represents the question 616A of the question-answer pair 616. FAQ_A represents the answer 616B of the question-answer pair 616. Diff_comp_in_User_Q represents the different keywords that are in the sample query 602 that are not contained in the question 616A. Diff_comp_in_FAQ_Q represents the different keywords that are in the question 616A that are not contained in the sample query 602. As such, the embedding boost is configured to represent at least one or more keyword differences (e.g., different keywords that are related in terms of similarity and/or meaning) between the sample query 602 and the expected relevant response 618. Each embedding boost of the training set is then used to train the transformer 614. In addition, the transformer 614 undergoes a fine-tuning process 628 before being employed for use.

Referring to FIG. 6C, during testing or employment, the response generator 208 is configured to generate an appropriate response to a query 10 based on the classification of a selected candidate (i.e., a selected question-answer pair from the FAQ data source 202). More specifically, as shown in FIG. 3, the response generator 208 is configured to receive input data from the candidate classifier 206 and provide output data to the dialogue manager 212. As aforementioned, the candidate classifier 206 is configured to classify the candidate into a class from among of a predetermined group of classes. In this example, the predetermined group of classes includes at least a "match" class, a "relevant" class, and an "irrelevant" class. As shown in FIG. 6C, the response generator 208 is configured to respond differently according to these different classes. For example, when the class data indicates that a particular question-answer pair is a "match" with respect to the query 10, as indicated by case 1 in FIG. 6C, then the response generator 208 acknowledges that the answer of the question-answer pair is a valid response to the query 10. The response generator 208 includes an answer extractor 630, which includes at least one software component that is executed by the processing system 110 and configured to extract the answer from the question-answer pair and provide that answer as the output data. The response generator 208 then provides this output data to the dialogue manager 212, which manages and outputs the system response 20. In this case, the system response 20 includes the extracted answer.

As another example, when the class data indicates that the question-answer pair is "relevant" with respect to the query 10, as indicated by case 2 in FIG. 6C, then the response generator 208 is configured to generate output data via the transformer 600, the transformer 614, and a combiner 632. More specifically, the transformer 600 is trained to receive the query 10 as input and generate a negative confirmation as output. For instance, upon receiving the user query 10B of "Do you have a fitness center in the hotel?," the transformer 600 is configured to generate the negative confirmation of "No, we do not have a fitness center here," as output data.

In addition, the transformer 614 is trained to receive the query 10 and the question of the question-answer pair as input data and generate a relevant response as output data. For instance, referring to the example of FIG. 2A, upon receiving the user query 10I3 of "Do you have a fitness center in the hotel?" and the question 202B of "Is there any swimming pool onsite?" from the question-answer pair 202A, the transformer 614 is configured to generate and output the following relevant response: "We have a swimming pool. Do you want that information?" In this regard, the transformer 614 identifies the "swimming pool" from the question 202B as being relevant to the user query 10B and thus presents this data in the output data. Also, as shown in FIG. 6C, the response generator 208 includes the combiner 632, which includes at least one software component that is executed by the processing system 110 and configured to combine the negative confirmation and the relevant response. This combination results in the following output data: "No, we do not have a fitness center here. We have a swimming pool. Do you want that information?" The response generator 208 provides this output data to the dialogue manager 212, which is configured to manage and output the system response 20B.

As yet another example, when the class data indicates that the question-answer pair is "irrelevant" with respect to the query 10, as indicated by case 3 in FIG. 6C, then the response generator 208 is configured to discard the question-answer pair. The response generator 208 also includes an irrelevant notifier 634, which includes at least one software component that is executed by the processing system 110 and configured to notify the dialogue manager 212 that the question-answer pair is irrelevant. In this case, since the question-answer pair is irrelevant and discarded, the response generator 208 does not generate a response to the query 10 based on that question-answer pair. This feature is advantageous in ensuring that the response generator 208 only presents useful and helpful information to the user based on an assessment of the retrieved data from the FAQ data source 202.

Figure 7:
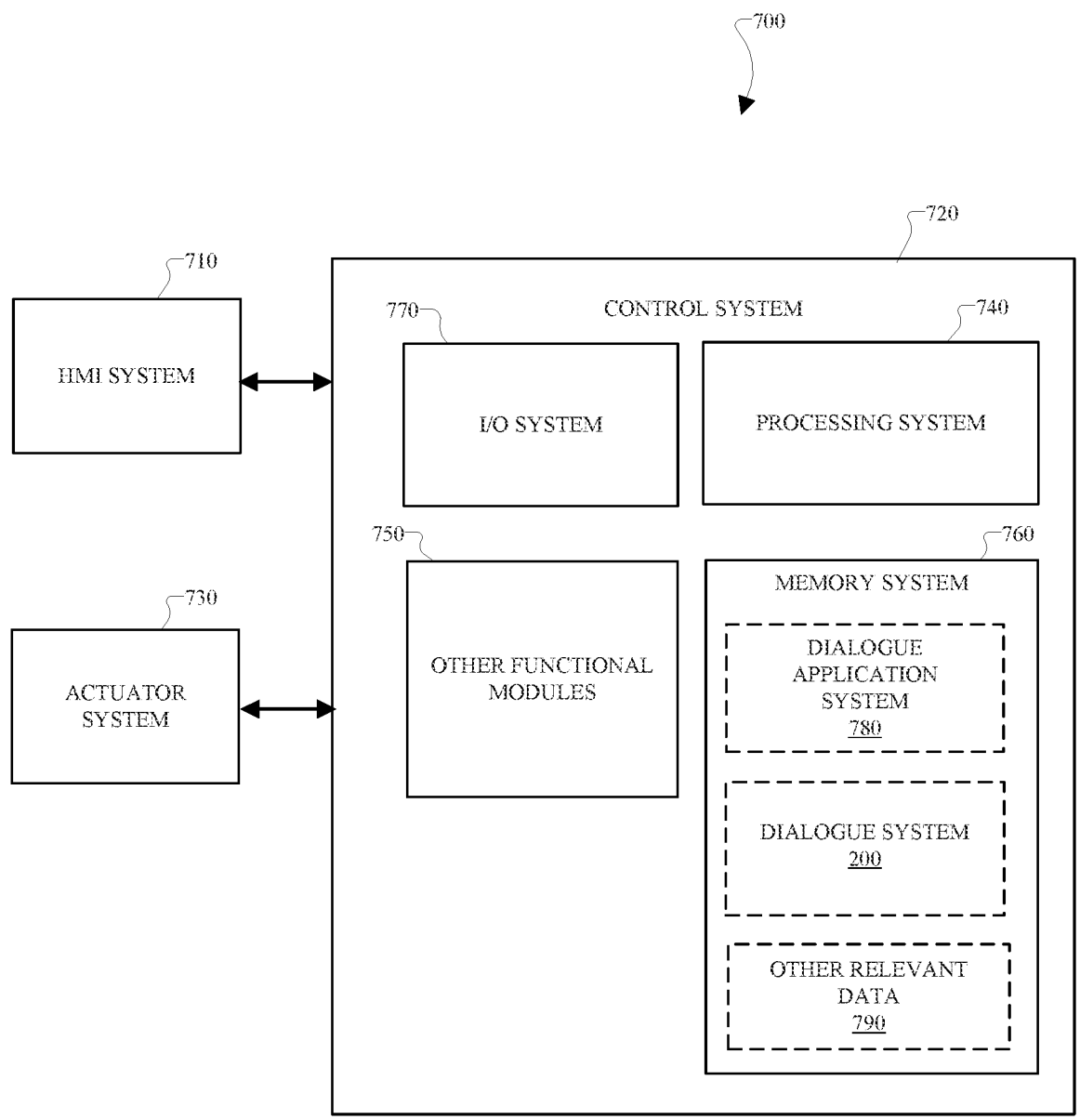
FIG. 7 is a diagram of an example of a control system that includes the dialogue system of FIG. 1 according to an example embodiment of this disclosure.

FIG. 7 is a diagram of a system 700, which is configured to include at least the dialogue system 200. In this regard, the system 700 includes at least an HMI system 710, a control system 720, and an actuator system 730. The system 700 is configured such that the control system 720 controls the actuator system 730, for example, based on the input received from the HMI system 710. More specifically, the HMI system 710 includes one or more user interfaces and/or devices that communicate with one or more I/O devices of the I/O system 770. Upon obtaining input, the HMI system 710 is operable to communicate with the control system 720 via the input/output (I/O) system 770 and/or other functional modules 750, which includes communication technology.

The control system 720 is configured to obtain input from at least the HMI system 710. Upon receiving input, the control system 720 is operable to process the input via a processing system 740. In this regard, the processing system 740 includes at least one processor. For example, the processing system 740 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any number and combination thereof. Upon processing at least the input received from the HMI system 710, the processing system 740 is operable to provide the dialogue system 200 with a query 10 based on the input. The processing system 740 is also configured to generate at least a system response 20 via the dialogue system 200. The processing system 740 is configured to generate output data based on the system response 20 (e.g., the answer or the relevant response). The processing system 740 is configured to provide the output data to the user via the I/O system 770 and/or the HMI system 710. In addition, the processing system 740 is operable to generate actuator control data based on the output data. The control system 720 is configured to control the actuator system 730 according to the actuator control data.

The memory system 760 is configured to store and provide access to various data to enable at least the operations and functionality, as disclosed herein. The memory system 760 comprises a single device or a plurality of devices. The memory system 760 includes electrical, electronic, magnetic, optical, semiconductor, electromagnetic, any suitable memory technology, or any combination thereof. For instance, the memory system 760 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 720 and/or processing system 740, the memory system 760 is local, remote, or a combination thereof (e.g., partly local and partly remote). For example, the memory system 760 is configurable to include at least a cloud-based storage system (e.g. cloud-based database system), which is remote from the processing system 740 and/or other components of the control system 720.

The memory system 760 includes the dialogue system 200, which includes the trained machine learning systems discussed above. These trained machine learning systems are configured to be implemented, executed, and/or employed via the processing system 740. In addition, the memory system 760 may further include a dialogue application system 780. The dialogue application system 780 is configured to process the input from the HMI system 710, the I/O system 770, the memory system 760, or any combination thereof. In addition, the dialogue application system 780 is configured to generate output data based on the system response 20 (e.g., the answer or relevant response) as obtained from the dialogue system 200. In general, the dialogue application system 780 is configured to enable the dialogue system 200 to operate seamlessly as a part of the control system 720 for the desired application.

Furthermore, as shown in FIG. 7, the system 700 includes other components that contribute to operation of the control system 720 in relation to the HMI system 710 and the actuator system 730. For example, as shown in FIG. 7, the memory system 760 is also configured to store other relevant data 790, which relates to the operation of the system 700. Also, as shown in FIG. 7, the control system 720 includes the I/O system 770, which includes one or more I/O devices that relate to the system 700. Also, the control system 720 is configured to provide other functional modules 750, such as any appropriate hardware technology, software technology, or any combination thereof that assist with and/or contribute to the functioning of the system 700. For example, the other functional modules 750 include an operating system and communication technology that enables components of the system 700 to communicate with each other as described herein. Also, the components of the system 700 are not limited to this configuration, but may include any suitable configuration provided that the system 700 performs the functionalities as described herein. For example, the HMI system 710 may be a more integral part of the I/O system 770 and/or the control system 720. Accordingly, the system 700 is useful in various applications.

For example, as a non-limiting example, the system 700 includes the dialogue system 200 to provide customer service and/or troubleshooting assistance. In this case, the system 700 may or may not include the actuator system 730. Also, the HMI system 710 may include a user interface, which operates with the I/O system 770 (e.g., a touchscreen device, keyboard, microphone, gesturing technology, etc.) to provide input data to the processing system 740 and/or the dialogue system 200. Upon obtaining a query 10 from the input data, the processing system 740 and the dialogue system 200 are configured to provide a system response 20 (e.g., an answer or a relevant response). In one example, the processing system 740 is configured to provide the system response 20 directly or indirectly as output data via the I/O system 770 and/or the HMI system 710. In another example, the processing system 740 is configured to generate actuator control data based on the system response 20. In this case, the control system 720 is configured to control the actuator system 730 according to the actuator control data.

Figure 8:
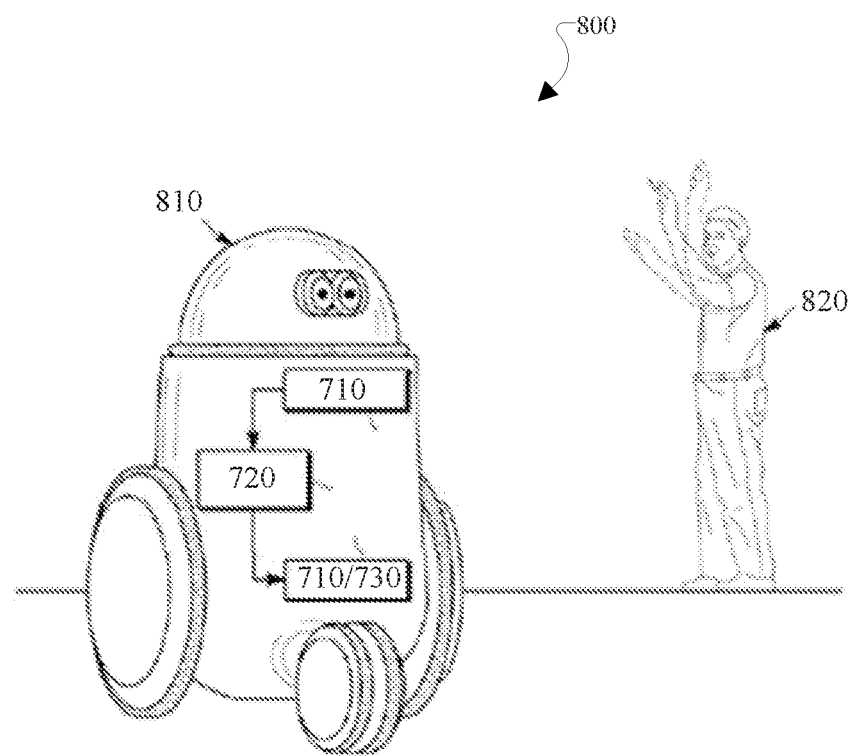
FIG. 8 is a diagram of an example of the control system of FIG. 7 with respect to robot and/or automated personal assistant technology according to an example embodiment of this disclosure.

FIG. 8 is a diagram of an example of an application of the dialogue system 200 with respect to automated personal assistant technology 800 according to an example embodiment. For instance, as a non-limiting example, the automated personal assistant technology 800 is a robot 810, which is configured to receive input. The automated personal assistant technology 800 is configured to process the input and provide a query 10 to the dialogue system 200. In response to the query 10, the automated personal assistant technology 800 is configured to generate a system response 20 via the dialogue system 200. In addition, the automated personal assistant technology 800 is configured to control an appliance based on the system response 20. As a non-limiting example, the appliance may include a washing machine, a stove, a vacuum cleaner, an oven, a microwave, a dishwasher, another type of domestic appliance, any suitable apparatus, or any number and combination thereof. The HMI system 710 includes at least one user interface that operates together with the I/O system 770 (e.g., a microphone, a touchscreen, a keyboard, display technology, gesturing technology, a camera, a sensor, or any suitable technology) to obtain input.

In FIG. 8, the control system 720 is configured to obtain the input (e.g., audio commands, touchscreen commands, etc.) from the user 820 via the system 710 and/or the I/O system 770. The control system 720 is configured to process the input. The control system 720 is configured to provide a query 10 based on the input. In addition, the control system 720 is configured to provide a system response 20 (e.g. answer or relevant response) in response to the query 10 via the dialogue system 200. The control system 720 is configured to generate output data based on the system response 20. The control system 720 is configured to provide the system response 20 to the I/O system 770 and/or the HMI system 710. The control system 720 is configured to generate actuator control data based on the output data and/or the system response 20. Also, in response to the actuator control data, the control system 720 is configured to control the actuator system 730.

Figure 9:
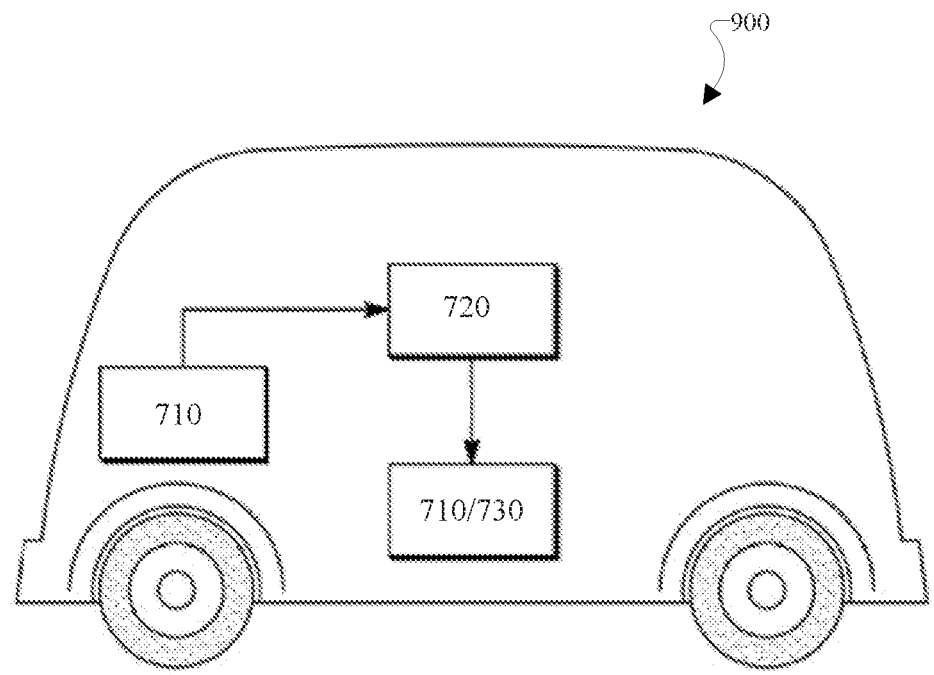
FIG. 9 is a diagram of an example of the control system of FIG. 7 with respect to mobile machine technology according to an example embodiment of this disclosure.

FIG. 9 is a diagram of an example of an application of the system 100 with respect to mobile machine technology according to an example embodiment. As a non-limiting example, the mobile machine technology includes at a vehicle 900, which is at least partially autonomous or fully autonomous. In FIG. 9, the vehicle 900 includes an HMI system 710 and an I/O system 770, which is configured to receive input. Based on the input, the control system 720 is configured to provide at least a query 10 to the dialogue system 200. The dialogue system 200 is configured to provide a system response 20 (e.g., an answer or relevant response) in response to the query 10. The control system 720 is configured to provide the system response 20 to the I/O system 770 and/or the HMI system 710. The control system 720 is configured to generate actuator control data, which is at least based on the system response 20. In this regard, the actuator system 730 is configured to include a braking system, a propulsion system, an engine, a drivetrain, a steering system, or any number and combination of actuators of the vehicle 900. The actuator system 730 is configured to control the vehicle 900 so that the vehicle 900 follows rules of the roads and avoids collisions based at least on the system response 20 provided by the dialogue system 200. For instance, as a non-limiting example, the actuator system 730 is configured to actuate at least the braking system to stop the vehicle 900 upon receiving the actuator control data.

As described herein, the dialogue system 200 provides a number of advantageous features, as well as benefits. For example, the dialogue system 200 is advantageously configured to generate an appropriate type of system response 20 based on a classification process, which takes into account (i) a similarity of the query 10 with respect to the retrieved data and (ii) a similarity of the query 10 with respect to a scope of the retrieved data. More specifically, for example, the dialogue system 200 is configured to respond to a query 10 with a system response 20 that includes a predetermined answer, which is extracted from a question-answer pair upon determining that the question-answer pair is a "match" with respect to the query 10. The dialogue system 200 is also configured to respond to a query 10 with a system response 20 that includes other relevant data (or alternative information) upon determining that the question-answer pair is "relevant" with respect to the query 10 instead of a "match." In such a case, the dialogue system 200 is configured to refer to that retrieved data (e.g., alternative information of the question-answer pair), which is deemed to be relevant to the query 10 and which the user may not be aware to request otherwise. Also, the dialogue system 200 includes a novel text generation approach to provide this relevant data (e.g., alternative information) as a system response 20 upon determining that a "match" is not available for the query 10. As an example, the dialogue system 200 is advantageously configured to generate a system response 20 that notifies the user that the requested information is not available while also notifying the user that some relevant or alternative information can be provided if the user is interested in this relevant or alternative information. This dialogue system 200 is therefore configured to offer greater assistance by identifying relevant or alternative information and offering this relevant or alternative information to the user.

As an advantage, the dialogue system 200 leverages machine learning systems, such as a transformer framework with artificial neural transformer models, to generate these system responses 20. Also, the dialogue system 200 is configured to use these artificial neural transformer models to leverage the power of embeddings for downstream tasks such as semantic similarities and language generation. The dialogue system 200 also employs an embedding index 214 to quickly and efficiently determine similarities between the query 10 and the question-answer pairs in the FAQ data source 202. In addition, by leveraging one or more machine learning systems, the dialogue system 200 is advantageously configured to receive multiple units (e.g., sentences) of text inputs and generate a relevant response with alternative information by comparing these multiple units of text inputs. Overall, the dialogue system 200 is configured to better serve the information needs of a user by providing various types of responses based upon various classifications of the retrieved data, which may be used to address the queries.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for a dialogue system, the computer-implemented method comprising:
    obtaining a query;
    generating a first similarity score for a question-answer pair based on a first similarity determination between the query and the question-answer pair, the question-answer pair including (i) a question and (ii) an answer to the question;
    identifying the question-answer pair as a candidate to address the query based on the first similarity score;
    generating a second similarity score based on a second similarity determination between the query and at least one predetermined scope of the candidate, the at least one predetermined scope of the candidate being derived from other versions of the candidate;
    generating classification data to indicate that the candidate is relevant to the query based on a combined similarity score that takes into account the first similarity score and the second similarity score;

providing the query and the question as input to a first machine learning system based on the classification data;

generating, via the first machine learning system including a first neural transformer model, a relevant response, the relevant response providing information associated with a keyword of the question that is not contained in the query; and generating output data for automated personal technology to respond to the query, wherein, the step of generating the second similarity score includes at least generating, via a second machine learning system, a first component of the second similarity score based on a similarity between the query and a predetermined scope of the question, the predetermined scope of the question being defined by a classification boundary of the second machine learning system that is derived from paraphrased versions of the question of the candidate, and the output data includes at least the relevant response.

2. The computer-implemented method of claim 1, wherein the step of generating the first similarity score further comprises:

generating a first component of the first similarity score based on a similarity between the query and the question of the candidate as determined by an embedding index;

generating a second component of the first similarity score based on a similarity between the query and the answer of the candidate as determined by the embedding index; and generating the first similarity score based on the first component and the second component.

3. The computer-implemented method of claim 2, wherein the embedding index includes first embedding data that is associated with the question of the question-answer pair and second embedding data that is associated with the answer of the question-answer pair.

4. The computer-implemented method of claim 1, wherein the step of generating the second similarity score further comprises:

generating, via a third machine learning system, a second component of the second similarity score based on a similarity between the query and a predetermined scope of the answer, the predetermined scope of the answer being defined by another classification boundary of the third machine learning system that is derived from paraphrased versions of the answer of the candidate; and generating the second similarity score based on the first component and the second component.

5. The computer-implemented method of claim 1, further comprising:

generating, via another machine learning system, a negative confirmation to confirm that a predetermined answer is not available for the query, wherein the output data includes the negative confirmation and the relevant response.

6. The computer-implemented method of claim 5, wherein:

the first neural transformer model is configured to generate the relevant response based on the query and the question of the candidate; and the another machine learning system includes at least another neural transformer model to generate the negative confirmation based on the query.

7. The computer-implemented method of claim 1, further comprising:

obtaining another query;

generating another first similarity score for another question-answer pair based on another first similarity determination between the another query and the another question-answer pair, the another question-answer pair including (i) another question and (ii) another answer to the another question;

identifying the another question-answer pair as another candidate to address the another query based on the another first similarity score;

generating another second similarity score based on another second similarity determination between the another query and at least one predetermined scope of the another candidate, the at least one predetermined scope of the another candidate being derived from paraphrased versions of the another candidate;

generating another classification data to indicate that the another candidate is deemed to exhibit a greatest similarity level to the query based on another combined similarity score that takes into account the another first similarity score and the another second similarity score; and generating another output data in response to the another query, wherein, the another output data includes the another answer.

8. A data processing system comprising:

a non-transitory computer readable medium including computer readable data that, when executed, is configured to implement a dialogue system; and a processor operably connected with the non-transitory computer readable medium, the processor being configured to execute the computer readable data to implement the dialogue system by performing a method that includes:

obtaining a query;

generating a first similarity score for a question-answer pair based on a first similarity determination between the query and the question-answer pair, the question-answer pair including (i) a question and (ii) an answer to the question;

identifying the question-answer pair as a candidate to address the query based on the first similarity score;

generating a second similarity score based on a second similarity determination between the query and at least one predetermined scope of the candidate, the at least one predetermined scope of the candidate being derived from other versions of the candidate;

generating classification data to indicate that the candidate is relevant to the query based on a combined similarity score that takes into account the first similarity score and the second similarity score;

providing the query and the question as input to a first machine learning system based on the classification data;

generating, via the first machine learning system including a first neural transformer model, a relevant response, the relevant response providing information associated with a keyword of the question that is not contained in the query; and generating output data for automated personal technology to respond to the query, wherein, the step of generating the second similarity score includes at least generating, via a second machine learning system, a first component of the second similarity score based on a similarity between the query and a predetermined scope of the question, the predetermined scope of the question being derived from paraphrased versions of the question of the candidate, and the output data includes at least the relevant response.

9. The data processing system of claim 8, wherein the processor is further configured to:
generate a first component of the first similarity score based on a similarity between the query and the question of the candidate as determined by an embedding index;
generate a second component of the first similarity score based on a similarity between the query and the answer of the candidate as determined by the embedding index; and
generate the first similarity score based on the first component and the second component.

10. The data processing system of claim 9, wherein the embedding index includes first embedding index data that is associated with the question of the question-answer pair and second embedding index data that is associated with the answer of the question-answer pair.

11. The data processing system of claim 8, wherein the processor is further configured to:
generate, via a third machine learning system, a second component of the second similarity score based on a similarity between the query and a predetermined scope of the answer, the predetermined scope of the answer being derived from paraphrased versions of the answer of the candidate; and
generate the second similarity score based on the first component and the second component.

12. The data processing system of claim 8, wherein:
the processor is further configured to generate, via another machine learning system, a negative confirmation indicating that a predetermined answer is not available for the query; and
the output data includes the negative confirmation and the relevant response.

13. The data processing system of claim 12, wherein:
the first neural transformer model is configured to generate the relevant response based on the query and the question of the candidate; and
the another machine learning system includes another neural transformer model to generate the negative confirmation based on the query.

14. The data processing system of claim 8, wherein the processor is further configured to:
obtain another query;
generate another first similarity score for another question-answer pair based on another first similarity determination between the another query and the another question answer pair, the another question-answer pair including (i) another question and (ii) another answer to the another question;
identify the another question-answer pair as another candidate to address the another query based on the another first similarity score;
generate another second similarity score based on another second similarity determination between the another query and at least one second predetermined scope of the another candidate, the at least one second predetermined scope of the another candidate being derived from paraphrased versions of the another candidate;
generate another classification data to indicate that the another candidate is deemed to exhibit a greatest similarity level to the query based on another combined similarity score that takes into account the another first similarity score and the another second similarity score; and
generate another output data in response to the another query,
wherein the another output data includes the another answer.

15. A computer-implemented method for a dialogue system, the computer-implemented method comprising:
obtaining a query;
selecting a candidate based on a first similarity score that is computed with respect to the query, the candidate including (i) a question and (ii) an answer to the question;
generating a second similarity score based on a similarity determination between the query and at least one predetermined scope of the candidate, the at least one predetermined scope of the candidate being derived from paraphrased versions of the candidate;
classifying the candidate into a class that indicates that the candidate is relevant to the query from among a group of classes that includes the class and another class, the another class indicating that the candidate has the answer to the query;
generating, via a first machine learning system including a trained neural transformer model, a relevant response to the query upon receiving input data that includes at least the query and the question, the relevant response providing information associated with a keyword of the question that is not contained in the query; and
generating output data for automated personal technology to respond to the query,
wherein, the output data includes at least the relevant response,
the predetermined scope of the candidate includes at least a first component that includes a predetermined scope of the question of the candidate, the predetermined scope of the question being defined by a first classification boundary of a first support vector machine,
the candidate is classified based on a combined similarity score that takes into account the first similarity score and the second similarity score, and
the relevant response is generated after the candidate is classified as belonging to the class.

16. The computer-implemented method of claim 15, wherein:
the trained neural transformer model is trained with training data that includes embeddings corresponding to (a) a sample query, (b) sample question, (c) a sample answer to the question, (d) a sample keyword of the sample query that is not in the sample question, and (e) another sample keyword of the sample question that is not in the sample query; and
the embeddings include token embedding, sentence embedding, and positional embedding.

17. The computer-implemented method of claim 15, further comprising:
generating the first similarity score for the candidate based on another similarity determination between the query and the candidate; and.

18. The computer-implemented method of claim 17, wherein the first similarity score is computed for the query via an embedding index with respect to the candidate.

19. The computer-implemented method of claim 17, wherein the predetermined scope of the candidate further includes:

a second component that includes a predetermined scope of the answer of the candidate, the predetermined scope of the answer being defined by a second classification boundary of a second support vector machine.

* * * * *